United States Patent
Hedrick

(10) Patent No.: US 6,952,630 B2
(45) Date of Patent: Oct. 4, 2005

(54) METHOD AND APPARATUS FOR FACILITATING EASE OF VIEWING AND INTERPRETATION OF DATA CONCURRENTLY PRESENTED TO THE FLIGHT CREW ON A MULTIFUNCTION FLAT PANEL DISPLAY IN AN AIRCRAFT

(76) Inventor: Geoffrey S. M. Hedrick, 14 Laurel Cir., Malvern, PA (US) 19355-2912

( * ) Notice: Subject to any disclaimer, the term of this patent is extended or adjusted under 35 U.S.C. 154(b) by 0 days.

(21) Appl. No.: 10/616,209

(22) Filed: Jul. 8, 2003

(65) Prior Publication Data
US 2004/0059472 A1 Mar. 25, 2004

Related U.S. Application Data

(60) Provisional application No. 60/394,543, filed on Jul. 8, 2002.

(51) Int. Cl.$^7$ .............................. G05D 1/00; G06F 7/00
(52) U.S. Cl. ........................... 701/3; 340/461; 340/971; 345/589; 349/68; 362/489
(58) Field of Search ................................. 359/601, 609; 349/11, 61, 68–69, 77; 362/459, 464–466, 529, 470–471, 487–489, 23–29; 340/461, 961, 500, 521, 523, 945, 952–956, 963–965, 971–973, 980; 348/673, 689; 345/619, 629, 672, 681, 678, 690, 581, 589–593, 764–765; 701/3–4, 8–10, 14–16

(56) References Cited

U.S. PATENT DOCUMENTS

| | | | | |
|---|---|---|---|---|
| 4,914,733 A | | 4/1990 | Gralnick ..................... 340/961 |
| 5,075,694 A | | 12/1991 | Donnangelo et al. ....... 342/455 |
| 5,319,553 A | * | 6/1994 | Gregg et al. .................... 702/4 |
| 5,327,344 A | * | 7/1994 | Hoffman et al. .............. 701/32 |
| 5,673,987 A | * | 10/1997 | Futschik et al. .............. 362/23 |
| 5,801,680 A | * | 9/1998 | Minakuchi ................... 345/589 |
| 5,838,262 A | | 11/1998 | Kershner ..................... 340/945 |
| 6,038,498 A | * | 3/2000 | Briffe et al. .................... 701/3 |
| 6,057,786 A | | 5/2000 | Briffe et al. ................ 340/975 |
| 6,064,922 A | | 5/2000 | Lee ............................... 701/3 |
| 6,078,302 A | * | 6/2000 | Suzuki ......................... 345/77 |
| 6,259,981 B1 | * | 7/2001 | Wilcosky ..................... 701/29 |
| 6,389,332 B1 | * | 5/2002 | Hess et al. ..................... 701/1 |
| 6,483,245 B1 | * | 11/2002 | Weindorf et al. ............. 315/82 |
| 6,507,286 B2 | * | 1/2003 | Weindorf et al. ...... 340/815.75 |
| 6,512,529 B1 | * | 1/2003 | Janssen et al. ............. 345/790 |
| 6,556,134 B2 | * | 4/2003 | Nakaji et al. ............... 340/461 |
| 6,654,024 B1 | * | 11/2003 | Völkel ......................... 345/589 |
| 6,700,692 B2 | * | 3/2004 | Tonar et al. ................ 359/265 |
| 2003/0103141 A1 | * | 6/2003 | Bechtel et al. .............. 348/148 |
| 2004/0004557 A1 | * | 1/2004 | Sikora ......................... 340/945 |

\* cited by examiner

*Primary Examiner*—Jacques H. Louis-Jacques
(74) *Attorney, Agent, or Firm*—Cohen, Pontani, Lieberman & Pavane

(57) ABSTRACT

A flat panel display for presenting graphical renderings of aircraft flight, operation and system status data to an aircraft pilot renders the data at various predetermined brightness levels depending on the category of data assigned to that data. Primary data appears on the screen at a full brightness level and secondary data appears on the screen at a brightness level less than the full brightness level. In this manner, a wide variety and range of aircraft flight, operation and system status data can be simultaneously conveyed to the pilot on a single display screen through selective illumination of particular classes or categories of the data on the display at predetermined brightness levels, thereby advantageously directing the pilot's attention specifically to the primary data which is presented at full brightness. In various implementations and embodiments, the brightness of the secondary data can be selectively increased manually by a pilot, as by activation of a switch or touching of a touch-sensitive display screen in the region of the secondary data of interest, or can increase when pilot-initiated changes to manually-entered data are initiated or being made, or can be increased automatically in the event detection of an abnormal or emergency condition involving the secondary data.

19 Claims, 2 Drawing Sheets

METHOD AND APPARATUS FOR FACILITATING EASE OF VIEWING AND INTERPRETATION OF DATA CONCURRENTLY PRESENTED TO THE FLIGHT CREW ON A MULTIFUNCTION FLAT PANEL DISPLAY IN AN AIRCRAFT

RELATED APPLICATIONS

This application claims priority from U.S. Provisional Patent Application Ser. No. 60/394,543 which was filed on Jul. 8, 2002.

BACKGROUND OF THE INVENTION

1. Field of the Invention

This invention relates to flat panel displays for conveying flight and aircraft status information and data to aircraft pilots. More particularly, the present invention is directed to a flat panel display system and method for displaying flight and aircraft status information to an aircraft flight crew in a manner that facilitates the directing of viewer attention toward that data currently most important for operation of the aircraft and existing environmental and aircraft conditions.

2. Description of Related Art

Traditionally, a variety of aircraft status, control, flight, navigation and other data has been presented to the pilots and flight crews of large commercial airliners on a multiplicity of single-function instruments and gauges and the like. Many of these instruments and gauges have been mechanically, hydraulically and/or electromechanically operated and are variously located about the flight deck of an aircraft. Thus, by way of illustrative example, individual instruments have been provided to respectively display primary aircraft control data such as altitude, vertical speed, heading and attitude, while other individual instruments and gauges have respectively displayed engine-related parameters and data such as engine rpm's, hydraulic pressure, engine temperature, fuel flow and remaining quantity, and vacuum pressure—information that, while also essential to the operation of the aircraft, is of secondary importance in its moment-to-moment control and therefore normally does not require constant in-flight monitoring by a pilot. These many and various instruments and gauges have accordingly been disposed at a variety of locations within and about the aircraft flight deck so that the pilots have immediate access to the primary control data which is positioned directly before them, whereas the secondary and less critical indicators are situated in locations still readily accessible to the pilots but not necessarily directly before them so that when the pilots must consult those secondary indicators their known locations can be readily viewed.

In more modern commercial airliners flat panel displays (FPDs) are increasingly being employed to digitally display much of the data that has previously been presented by mechanical, hydraulic and electromechanical instruments and the like. Moreover, as improving FPD technology has permitted the economic manufacture and use of ever-larger and more capable FPDs, these flat screens are increasingly being employed to concurrently display, on a single relatively large FPD in an aircraft, numerous types of data that have previously been presented on a multiplicity of separate, single-function gauges. This has permitted more and more data to be placed directly in front of aircraft pilots, thereby making all such data concurrently available for immediate viewing by the flight crew without having to displace one's gaze away from the primary flight instruments on which the pilots must concentrate in controlling an in-flight aircraft. In this manner, pilot scanning of the numerous data indications presented for use in operating and controlling the aircraft is simplified, and pilot workload and fatigue are correspondingly reduced.

Yet despite the apparent advances in the safe operation and control of an aircraft that should presumably result from such compactions of the pilots' scan and required field of view to, for example, identify data indications of an unusual or unexpected nature or magnitude, a significant disadvantage with these ever-larger FPDs on which a significant amount of varied data is concurrently presented in an aircraft cockpit is the resulting information clutter on the display. The more information that is concurrently presented on a single display, the greater the possibility of momentary confusion or hesitation in locating and identifying and viewing the most significant data in an emergency or perceived emergency situation. Control of an aircraft often requires uninterrupted attention to the indications of the primary flight instruments, whether separately presented on individual single-function gauges or concurrently displayed on a single, multipurpose FPD. When additional information is added to such a multi-function display of primary flight data, the presence of that additional data can momentarily divert a pilot's attention from the information needed to maintain control of the aircraft in an emergency. Such additional information can also confuse or distract the pilot as the multiple types of concurrently displayed information can at a glance appear to run together on a crowded FPD. This may be the case even if precautions are taken such as by employing digitally-simulated bezels or like instrument boundaries on the FPD to segregate the types of data. In emergency situations even the briefest hesitation by a pilot can result in a total loss of control of the aircraft or other potentially catastrophic operating difficulties.

SUMMARY OF THE INVENTION

The present invention permits ever-increasing amounts of data to be concurrently presented on an FPD in an aircraft flight deck without jeopardizing the safe operation of the aircraft by reason of pilot distraction or confusion in consulting the appropriate flight control data indications on the FPD. This advantageous functionality is realized by defining, for each of the types or indications of data being presented, the relative importance of that data in controlling the aircraft.

In accordance with the invention, the most important ("primary") data is presented on the FPD at full display brightness—i.e. at that image brightness at which the data presented on the FPD would, in the absence of the present invention, normally be displayed on the screen. When a pilot quickly glances at the FPD, the primary (full brightness) data is most immediately apparent by virtue of its display at full FPD brightness. The data of lesser ("secondary") importance or criticality, as previously determined or identified or defined, is presented on the FPD at a relatively reduced brightness sufficient to enable that secondary data to be readily seen and viewed by the pilot but nevertheless appropriate to assure that, as the pilot quickly glances at the FPD, it is the most important (i.e. "primary") data that is first and immediately seen.

In a preferred embodiment, the reduced brightness data or images on, the FPD are of sufficiently lower intensity as to be peripherally ignored, or ignorable, by a pilot looking at the FPD to view the "primary" flight data, but nevertheless readily viewable at the reduced brightness level if the pilot wishes to consult that "secondary" data.

In accordance with a further feature of the invention, a pilot or other flight crew member is provided with the ability to quickly increase, on demand, the brightness of so-defined "secondary" data by manual operation of a suitable actuator placed, for example, on or in close proximity to the FPD. This functionality may be implemented by locating a depressible pushbutton or moveable toggle switch or touch-sensitive control or the like on the FPD bezel or casing periphery or closely adjacent to the FPD. Alternatively, a touch-sensitive region can be defined on the FPD screen for selectively activating the full-brightness viewing mode for the "secondary" data.

In further accordance with the invention, the brightness level of "secondary" data image(s) is automatically (i.e. without pilot intervention) increased to full-brightness in the event that the displayed data exceeds (or is close to exceeding or approaching) a predetermined threshold or parameter or otherwise indicates (or, is close to indicating or approaching) a fault or anomaly or other predetermined alarm condition.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE CURRENTLY PREFERRED EMBODIMENTS

Figure 1:
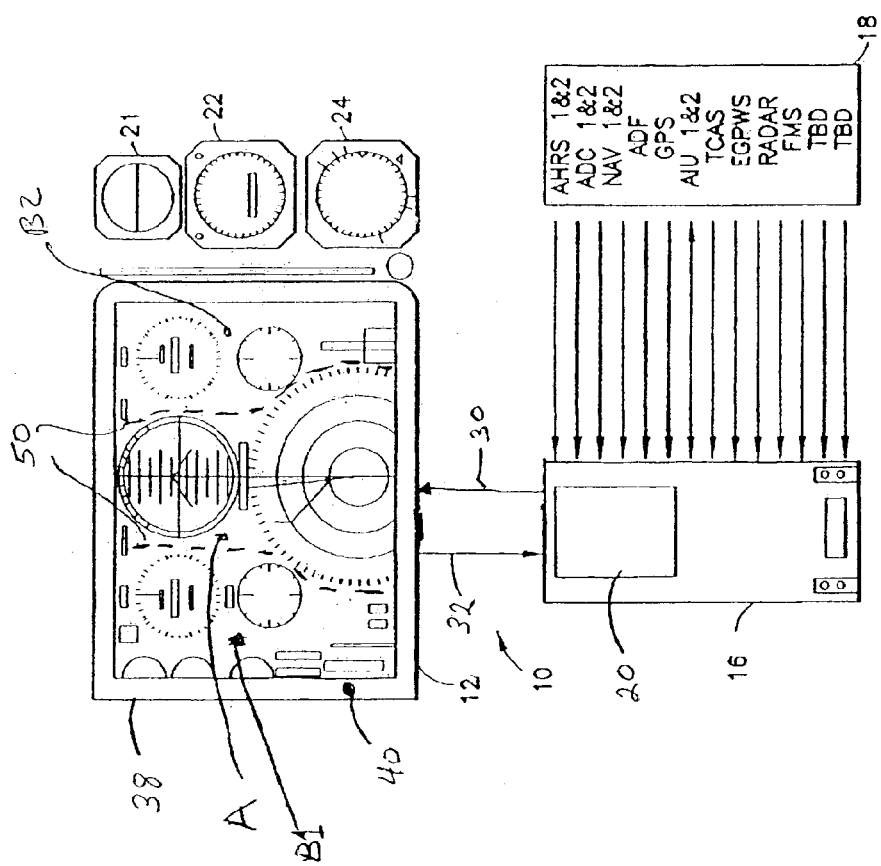
FIG. 1 depicts a block diagram of a flat panel display which depicts aircraft flight, operation and system status information of varying degrees of importance at different predetermined levels of illumination brightness in accordance with the present invention.

FIG. 1 depicts by way of illustration a currently preferred implementation of an aircraft flight panel display system 10 constructed in accordance with the present invention. In commercial aircraft, dual control stations, e.g. a pilot station and a co-pilot station, are generally present, with each control station including a separate flight panel control system for simultaneously displaying, on both display systems, aircraft control and operational data. It should be understood that although the invention described herein discusses only a single flight panel display system—which might be present, for example, in smaller and non-commercial aircraft—dual display systems may readily be employed.

Display system 10 includes, a display screen 12 such as a liquid crystal display. (LCD) or other illuminatable or otherwise viewable imaging display, either specially designed and constructed or, as for example known in the art, containing an array of individually-addressable pixels (i.e. picture elements) capable of operatively generating light at a range of selectively controllable intensity levels. Each pixel in the display has a corresponding address at which it can be individually accessed by control signals to graphically depict, in combination with other display pixels, images such as pointers and other indicators, simulated flight instruments and gauges, maps, terrain simulations, alphanumeric characters, etc. on screen 12, as is known in the art, and is further capable of displaying or radiating a color component such as red, green or blue (RGB values) or combinations thereof. In the display system 10 a dedicated symbol generator or controller 16 generates and outputs calculated imaging data that is used to illuminate the appropriate pixels in the display screen 12 and thereby create the intended images on the display. The imaging data is derived or calculated by a graphics processor 20 in or in communication with the controller 16 from sensor measurements and other input data and the like which is obtained from a plurality of aircraft and environmental sensors or inputs or other aircraft systems, collectively referred to herein as the sensors or sensor bank 18. Sensor bank 18 contains sensors that are disposed about and throughout the aircraft for ascertaining, measuring or "reading" the current values of often dynamically-varying flight control, telemetry, atmospheric, positional, and other aircraft and environmental condition information, and may also incorporate or be connected to an air data computer (ADC) or the like (not shown) which receives raw sensor data and prepares or modifies such raw data for transfer to the controller 16. The flight control reading and sensor systems may illustratively include or provide, by way of typical but nonlimiting example, altitude, heading and reference (AHRS) data; altitude, direction and control (ADC) data; navigational (NAV) data; automatic direction finder (ADF) data; global positioning system (GPS) data and devices; aircraft interface unit (AIU) data and devices; traffic alert and collision avoidance system (TCAS) data and devices; enhanced group proximity warning system (FGPWS) data and devices; and flight management system (FMS) data. As shown in FIG. 1, the display system 10 may also include or be disposed proximate or used in conjunction with one or more conventional backup or otherwise additional mechanical gauges or instruments, such for example as an attitude indicator 21, an altitude indicator 22 and an airspeed indicator 24.

Sensor data provided by sensor bank 18 is processed by the graphics rendering controller 16 and converted into graphics display data which is then conveyed, such as via an accelerated graphics port 30, for rendering images on screen 12 by illuminating select screen pixels. As shown, screen 12 will thereby display various graphically-delineated meters, pointers, gauges and other symbols to convey flight and system status data to a pilot. A key to the present invention is the ability to render graphics on the display screen 12 at various predetermined or otherwise definable intensity levels so that certain data will appear more prominent and pronounced to a pilot as compared to other data. To accomplish this, certain types or categories of data are rendered on the display screen in a more prominent, e.g., higher intensity and brightness, manner than other data that is concurrently rendered on the display. Data required for moment-to-moment control of an aircraft (referred to herein as "primary data"), such as altitude, attitude, airspeed, etc. which are typically associated with so-called primary flight instruments will be presented on the display at a "full" or high illumination brightness relative to data which is not required for moment-to-moment aircraft operation (referred to herein as "secondary data"), such as indications of various engine and aircraft parameters including hydraulic pressure, engine temperature, fuel flow and remaining quantity, and electrical system voltage and status. Those skilled in the art will appreciate that the actual lux level of the so-called "full" display brightness may itself vary as a function of predetermined or otherwise-defined environmental conditions or the like, such as the current ambient light level in the aircraft cockpit or which is incident on the FPD screen viewing surface. Thus, as used herein the term "full brightness" is intended to denote the image intensity that is deemed appropriate to enable ready viewing of data and images under then-current environmental conditions.

The segregation or categorization of the various types of data into two or more categories, such as primary and secondary data, can be accomplished by recognizing or identifying the types of data produced or conveyed by the sensors in the sensor bank 18. For example, data from a fuel level sensor will be recognized by the graphics rendering controller or computer as secondary data and displayed on the FPD in an appropriate manner, i.e. at the lower intensity level, whereas flight attitude or altitude data will be recognized by the graphics rendering controller, or a separate processor in communication with the graphics controller, as primary data and thereby illustrated on the FPD with a maximum or higher intensity or brightness. Thus, the presented data of the so-called primary flight instruments—including altitude, vertical speed, heading and attitude—are deemed the most important of those concurrently displayed on the FPD and the display of that information, whether alphanumerically or in simulated, virtual gauges or instruments will be effected at a "full" or higher brightness level relative to less critical data such as data that is not required for moment-to-moment flight control including, by way of illustrative example, engine temperature, fuel flow and remaining quantity, and electrical system status and voltage.

It will be appreciated that the difference in image brightness between the displayed "primary" data and "secondary" data itself facilitates ready viewing, as desired or intended, of both types of data; the "primary" data can be immediately identified at a glance by virtue of its full-brightness presentation, whereas the "secondary" data can be immediately identified and consulted at a glance by virtue of its, presentation at a reduced brightness that is apparent even when only quickly or momentarily viewing the FPD.

To further facilitate a pilot's or flight crew member's ability to quickly identify and consult the specific "primary" and/or "secondary" data of immediate interest, the various types or classes of data can be located on and about the FPD screen 12 in a particular arrangement suitable for the particular type(s) of data that is presented on the FPD. For example, FPD 12 can be divided, in a virtual sense, into regions or sectors "A" and "B" separated by a visible (or more preferably) phantom barrier 50 for accommodating display of the various types of data. For example, where the "primary" (full brightness) data concurrently displayed on the FPD is so-called primary flight data required to maintain moment-to-moment control of the aircraft, such by way of illustration as airspeed, heading, vertical speed, altitude, and attitude, graphical renderings for such data may be presented in FPD region "A" located at or near the central portion of the display. The "secondary" (reduced brightness) data on the other hand, such as engine operating parameters, e.g., hydraulic pressure, engine temperature, engine rpm's, electrical system status, and fuel flow, may be positioned at or about the edge(s) or periphery of the FPD screen (i.e. closer to the screen edge(s) than the "primary" data), in regions "B1" and "B2", thereby further assuring that in a quick glance at the FPD it is the full-brightness, aircraft primary flight control data in the centrally-located region A of the screen 12, that is most immediately seen. At the same time, the pilot's ability to quickly and without hesitation view the "secondary" engine operating parameter data located at or along the FPD screen edge(s) or periphery in regions B1 and B2 and displayed at a predetermined relatively reduced brightness level is likewise assured.

Although the embodiment of the invention herein described by way of illustrative example uses distinct regions A and B1, B2 for displaying graphically-rendered primary and secondary data, respectively, it should be readily appreciated that the regions need not be distinct but may, instead, overlap such that graphical renderings of primary data may be presented in regions B1 and/or B2 and vice versa provided, however, that the primary data graphical renderings can be readily distinguished from the secondary data renderings for ease of identification and consideration by the pilot. Similarly, although two secondary data regions B1, B2 are shown on the FIG. 1 display, a single secondary data region can instead be provided, and the relative locations of the regions A and B can be varied from that shown in FIG. 1 as a general matter of design choice and to suit a particular application. Moreover, while it is generally contemplated that the primary and second data renderings be grouped to further facilitate pilot attention to particular information presented on the display, it is also within the intended scope and contemplation of the invention that the locations of the different primary and secondary data may be scattered or otherwise placed at any desired locations on the display screen and may be intermixed as deemed suitable or appropriate for an intended application or use. It is also contemplated that additional categories of relative data importance can be established or defined as a matter of design choice and implementation. Specifically, data may be categorized in two or more (e.g., three) groups, with graphical renderings associated with each group displayed on respective multiple regions on the display and at varying intensity levels. For example, three visually detectable brightness levels may be presented on the display by the graphics rendering controller 16. Here, again, the three brightness levels may be applied to data or depictions rendered on the display at various intermixed locations throughout the display without grouping of each category of data into a separate (or overlapping) discrete region. The key to the present invention, therefore, is that data categorized by importance—which may denote typical importance in the operation of the aircraft or current importance due to a particular condition or event—is presented on the display at a predetermined brightness level defined for that level of importance, with the highest importance data presented at the brightest level of illumination and/or contrast, the next highest (i.e. next lower) importance data presented at a reduced brightness level relative to the highest importance data, and so on.

In a currently contemplated implementation of the invention in which (by way of illustration) two "levels" or "classes" of data importance are defined, the reduction of image intensity for the "secondary" data is by approximately one-half of the brightness level at which the "primary" data is presented. A third, lower-importance class of data would correspondingly be presented at an image brightness level less than that defined by the second class of data, which is in turn presented at an image brightness level less than that defined by the first or "primary" class of data.

In another embodiment, a manual control for predeterminately briefly or otherwise selectively increasing the brightness of a secondary data graphics rendering is provided for causing its brightness to equal the brightness of the primary data graphics renderings or, in particular situations, to exceed the brightness and/or contrast of the primary data graphics renderings. For example, a switch 40 such as a push button or toggle can be positioned on a bezel 38 of the display 12 for providing a command to the graphics rendering controller 16, via control line 32, when the switch is activated to increase the brightness of the secondary data from a relatively dim, partial brightness level to (or beyond) the "full" brightness level, and to return the brightness level of the secondary data from the full level to the partial brightness level either on demand or after a preset time interval. Alternatively, a dial knob or touch sensor can be provided for gradually adjusting the secondary data brightness to brightness levels between the partial and full brightness levels. Where the display screen is provided with touch-sensitive capabilities or functionality, the pilot or user may touch or tap on the display at the location of secondary or otherwise reduced-brightness data to cause that data to illuminate to the primary data brightness or to otherwise brighten for enhanced viewability. Such ability to quickly increase the "secondary" data image brightness level as needed—by whatever method or mechanism available or provided or deemed appropriate—assures that continued attention to and monitoring of particular "secondary" data can be carried out as and when necessary or desired, without compromising uninterrupted control of the aircraft through ongoing monitoring of the displayed primary flight instruments data.

In further accordance with the invention, the brightness level of displayed secondary data can be automatically increased to the primary brightness level, or to a different level brighter than the normal secondary data brightness level, in response to pilot action concerning that particular secondary data. It is typical in an aircraft for a pilot to manually adjust a variety of instrument parameters during flight operations, as for example periodic adjustment to reflect the changing local barometric pressure to thereby assure accuracy in the determination and presentation of current aircraft altitude. The currently-set local barometric pressure is typically presented on the display for viewing and review by the flight crew; since that setting nay be considered secondary data, it would normally be rendered at a secondary data illumination or brightness level. When the pilot or flight crew member commences such an adjustment to input a change in current local barometric pressure, which adjustment may for example be effected by manipulated rotation of a knob or through direct keypad input or in any other manner, the indication of current local barometric pressure on the display will automatically brighten to the illumination level of, by way of preferred example, the primary data so that the pilot's attention will immediately be drawn to the changed data being entered. Enhanced brightness illumination of the local barometric pressure display will continue for a predetermined interval—such for example as 3 to 5 seconds—after entry of the new local barometric pressure has been completed, at which time that data depiction or representation will revert to its normal or usual reduced brightness display level. In this manner pilot attention to manually or otherwise entered adjustments and inputs of data is readily drawn, on the display, to the adjusted or input data to thereby enhance accuracy in the operation.

It is further contemplated by the invention that automatic brightening of some or all of the secondary data graphic renderings may be caused in response to detection, by the graphics rendering controller 16 or an air data computer or a detector or other monitor in communication therewith, of an abnormal or emergency condition associated with the secondary data to alert the aircraft pilot to the detected abnormality or emergency. For example, upon detection of a low fuel condition, in a manner known in the art, the graphics rendering on the display for presentation of the fuel level will be rapidly brightened to a level at or above the brightness level of the primary data. In that situation the sudden and rapid brightening of the secondary data image, even in the absence of another visual or audible alarm indicator, immediately calls the pilot's attention to the approaching or existing alarm condition as that image or image region of the FPD screen abruptly and unexpectedly brightens from its normal reduced brightness condition to a full-brightness state. This automated rapid increase in brightness in the imaged "secondary" data relating to the abnormal or emergency condition in response to an alarm (or approaching alarm) condition may (as a general matter of design choice), and as explained above, be simultaneously applied to all of the displayed "secondary" data on the FPD or, alternatively (and as is currently preferred), only to the particular, "secondary" data image(s) or presentation(s) to which the actual or approaching alarm condition applies. The color in which the alarm-condition data is presented may also be changed, concurrent with the increase in brightness of the secondary data image, from that in which it is normally displayed to thereby further emphasize and call attention to the alarm condition. These and other such variations and modifications are within the intended scope and contemplation of the invention.

Figure 2:
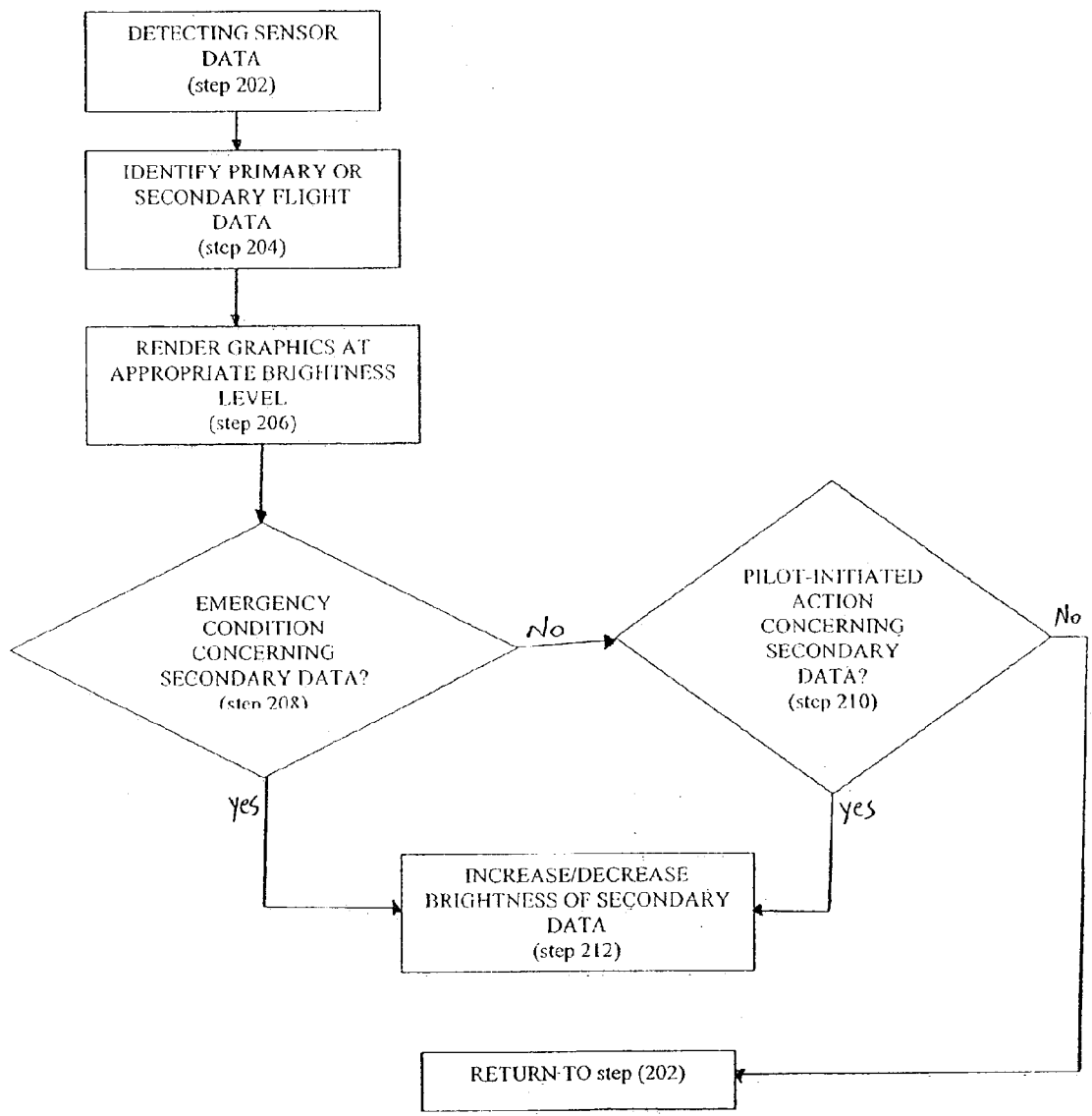
FIG. 2 is a flow chart illustration of a method for varying the intensity of predetermined aircraft flight, operation and system status data displayed on a flat panel display in an aircraft cockpit.

A method for effectuating the categorical graphic rendering of data on a FPD in accordance with the present invention is illustrated by the flow chart of FIG. 2. The method begins with the detection of sensor data (step 202), such for example via the sensor bank 18. A determination (step 204) is then made as to the type of data generated by the sensors, e.g. as primary or secondary data. Generally, the identification of which data depictions or indications rendered on the display are to be denoted "primary" data (and therefore rendered at a primary or full brightness), and which data depictions or indications rendered on the display are to be denoted "secondary" data (and therefore rendered at a secondary or reduced brightness), will be made by assignment during system design or setup. Once the category of data has been determined or identified a graphical rendering for depicting that data (or a simulated gauge or instrument utilizing or based on that data) is presented on the display screen 12 at an appropriate brightness level (step 206) so that primary data graphical renderings are presented at a relatively brighter intensity and secondary graphical renderings are presented at a relatively dimmer intensity. Thereafter, in the event an abnormal or emergency condition is detected (step 208) or a manual brightness switch is actuated or the touch-sensitive display screen is touched at the location of secondary or reduced-brightness data or a pilot-initiated change in displayed data is entered (step 210), the brightness of the secondary data graphical renderings is increased in response to the detected condition or manually-initiated action. When an alarm condition is no longer present, a time duration (e.g., 5 seconds, etc.) expires and/or further pilot interaction is detected—such as by activating a control or again touching the display screen 12, the increased-brightness graphics will return to the nominal brightness level (step 212).

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of presenting a combination of multiple types of data relating to at least one of environmental, aircraft flight, situational awareness, aircraft operation and aircraft systems status on a single display for ease of viewing of the presented data by a user of the aircraft, the method comprising:

identifying, among the multiple types of data, high importance primary data for presentation on the display;

identifying, among the multiple types of data, secondary data of lesser importance than the primary data for presentation of the secondary data on the display;

presenting the primary data on the display at a first brightness level appropriate for facilitating attention to and ease of viewing of the primary data on the display by the user;

presenting the secondary data on the display at a second brightness level predeterminately less than the first brightness level and suitable for viewing of the secondary data on the display by the user, detecting that the user is manually entering a new value of the secondary data requiring user attention to the secondary data on the display; and changing the brightness level of the secondary data on the display from the second brightness level to the first brightness level in response to said detecting that the user is manually entering the new value of the secondary data, and returning the changed brightness level of the secondary data from the first brightness level to the second brightness level a predetermined time interval after said detecting that the user is manually entering the new value of the secondary data.

2. A method in accordance with claim 1, wherein said secondary brightness level is approximately one-half said first brightness level.

3. A method in accordance with claim 1, wherein said presenting of the primary data comprises presenting the primary data in a central portion of the display, and said presenting of the secondary data comprises presenting the secondary data in a peripheral portion of the display peripherally about said central portion.

4. A method in accordance with claim 1, wherein the primary data comprises primary flight information for use in flying the aircraft.

5. A method of presenting a combination of multiple types of data relating to at least one of environmental, aircraft flight, situational awareness, aircraft operation and aircraft systems status on a single display for ease of viewing of the presented data by a user of the aircraft, the method comprising:

identifying, among the multiple types of data, high importance primary data for presentation on the display;

identifying, among the multiple types of data, secondary data of lesser importance than the primary data for presentation of the secondary data on the display;

presenting the primary data on the display at a first brightness level appropriate for facilitating attention to and ease of viewing of the primary data on the display by the user;

presenting the secondary data on the display at a second brightness level predeterminately less than the first brightness level and suitable for viewing of the secondary data on the display by the user, detecting user operation of a control operable for initiating a change in the secondary data brightness level on the display from the second brightness level to the first brightness level requiring user attention to the secondary data on the display; and changing the brightness level of the secondary data on the display from the second brightness level to the first brightness level in response to said detecting of the user operation of the control, and returning the changed brightness level of the secondary data from the first brightness level to the second brightness level a predetermined time interval after said detecting of the user operation of the control.

6. A method in accordance with claim 5, wherein said secondary brightness level is approximately one-half said first brightness level.

7. A method in accordance with claim 5, wherein said presenting of the primary data comprises presenting the primary data in a central portion of the display, and said presenting of the secondary data comprises presenting the secondary data in a peripheral portion of the display peripherally about said central portion.

8. A method in accordance with claim 5, wherein the primary data comprises primary flight information for use in flying the aircraft.

9. A method of presenting a combination of multiple types of data relating to at least one of environmental, aircraft flight, situational awareness, aircraft operation and aircraft systems status on a single touch sensitive display screen for ease of viewing of the presented data by a user of the aircraft, the method comprising:

identifying, among the multiple types of data, high importance primary data for presentation on the display;

identifying, among the multiple types of data, secondary data of lesser importance than the primary data for presentation of the secondary data on the display;

presenting the primary data on the display at a first brightness level appropriate for facilitating attention to and ease of viewing of the primary data on the display by the user;

presenting the secondary data on the display at a second brightness level predeterminately less than the first brightness level and suitable for viewing of the secondary data on the display by the user;

detecting user contact with the display screen in a region of the display screen at which the secondary data is presented on the display requiring user attention to the secondary data on the display; and changing the brightness level of the secondary data on the display from the second brightness level to the first brightness level in response to said detecting of the user contact with the display screen, and returning the changed brightness level of the secondary data from the first brightness level to the second brightness level a predetermined time interval after said detecting of the user contact with the display screen.

10. A method in accordance with claim 9, further comprising the step of:
   detecting that the secondary data represents an abnormal condition.

11. A method in accordance with claim 9, further comprising the step of:
   detecting that the secondary data has a value comprising a predetermined alarm condition.

12. A method in accordance with claim 9, wherein said secondary brightness level is approximately one-half said first brightness level.

13. A method in accordance with claim 9, wherein the primary data comprises primary flight information for use in flying the aircraft.

14. An aircraft instrumentation display system for presenting a combination of multiple types of data relating to at least one of environmental, aircraft flight, situational awareness, aircraft operation and aircraft systems status on a single display for ease of viewing of the presented data by a user of the aircraft, said system comprising:
   a flat panel display screen;
   a display controller connected to the display screen and operable for receiving data to be imaged on the display screen and for rendering the received data to create graphically-implemented images representing the received data on the display screen, said display controller being further operable for:
   presenting received data identified, from among the multiple types of data, as high importance primary data on the display screen at a first brightness level appropriate for facilitating attention to and ease of viewing of the primary data on the display screen by the user,
   presenting received data identified, from the among the multiple types of data, as secondary data of lesser importance than the primary data on the display screen at a second brightness level predeterminately less than the first brightness level and suitable for viewing of the secondary data on the display screen by the user, and
   changing the brightness level at which the secondary data is presented on the display screen from the second brightness level to the first brightness level in response to detection of manual entry by the user of a new value of the secondary data requiring user attention to the secondary data imaged on the display screen, and returning the changed brightness level of the secondary data from the first brightness level to the second brightness level a predetermined time interval after the manual entry by the user of the new value of the secondary data; and
   a detector connected to the display controller for detecting the manual entry by the user of the new value of the secondary data requiring user attention to the secondary data imaged on the display screen.

15. An aircraft instrumentation display system in accordance with claim 14, wherein at least one of the detector and the display controller is further operable to detect an abnormal condition of the secondary data.

16. An aircraft instrumentation display system in accordance with claim 14, wherein at least one of the detector and the display controller is further operable to detect a value of the secondary data denoting a predetermined alarm condition.

17. An aircraft instrumentation display system in accordance with claim 14, wherein said display screen further comprises a touch-sensitive display screen, and wherein the manual entry by the user of the new value of the secondary data is performed by contacting the display screen in a region of the display screen at which the secondary data is presented on the display.

18. A method in accordance with claim 9, wherein said presenting of the primary data comprises presenting the primary data in a central portion of the display, and said presenting of the secondary data comprises presenting the secondary data in a peripheral portion of the display peripherally about said central portion.

19. An aircraft instrumentation display system for presenting a combination of multiple types of data relating to at least one of environmental, aircraft flight, situational awareness, aircraft operation and aircraft systems status on a single display for ease of viewing of the presented data by a user of the aircraft, said system comprising:
   a flat panel display screen; and
   a display controller connected to the display screen and operable for receiving data to be imaged on the display screen and for rendering the received data to create graphically-implemented images representing the received data on the display screen, said display controller being further operable for:
   presenting received data identified, from among the multiple types of data, as high importance primary data on the display screen at a first brightness level appropriate for facilitating attention to and ease of viewing of the primary data on the display screen by the user,
   presenting received data identified, from the among the multiple types of data, as secondary data of lesser importance than the primary data on the display screen at a second brightness level predeterminately less than the first brightness level and suitable for viewing of the secondary data on the display screen by the user, and
   changing the brightness level at which the secondary data is presented on the display screen from the second brightness level to the first brightness level in response to detection of
   user operation of a control operable for initiating a change in the secondary data brightness level on the display screen from the second brightness level to the first brightness level requiring user attention to the secondary data imaged on the display screen, and returning the changed brightness level of the secondary data from the first brightness level to the second brightness level a predetermined time interval after the manual entry by the user operation of the control; and
   a detector connected to the display controller for detecting user operation of a control operable for initiating a change in the secondary data brightness level on the display screen from the second brightness level to the first brightness level requiring user attention to the secondary data imaged on the display screen.

* * * * *